(12) United States Patent
Lu et al.

(10) Patent No.: US 6,509,949 B1
(45) Date of Patent: Jan. 21, 2003

(54) METHOD OF RESIZING A LIQUID CRYSTAL DISPLAY

(75) Inventors: Kanghua Lu, Waldwick, NJ (US); Robert J. Saccomanno, Montville, NJ (US); Ron Welch, Oak Ridge, NY (US); Glen Merle Thompson, Pequannock, NJ (US); Thomas P. Marron, Wayne, NJ (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 09/696,441

(22) Filed: Oct. 25, 2000

Related U.S. Application Data
(60) Provisional application No. 60/172,753, filed on Dec. 20, 1999.

(51) Int. Cl.[7] .............................................. G02F 1/1333
(52) U.S. Cl. ...................................... 349/187; 349/192
(58) Field of Search .................................. 349/153, 187, 349/190, 192, 96, 117

(56) References Cited

U.S. PATENT DOCUMENTS

| | | | |
|---|---|---|---|
| 4,094,058 A | 6/1978 | Yasutake et al. | 29/592 R |
| 4,255,848 A | 3/1981 | Freer et al. | 29/592 R |
| 4,275,494 A | 6/1981 | Kobyama et al. | 29/592 R |
| 4,455,185 A | 6/1984 | Sasaki et al. | 156/250 |
| 4,597,636 A | 7/1986 | Hoshikawa | 350/334 |
| 4,829,404 A * | 5/1989 | Jensen | 361/398 |
| 4,830,554 A | 5/1989 | Lopez | 409/164 |
| 5,150,237 A * | 9/1992 | Iimura et al. | 359/73 |
| 5,175,638 A * | 12/1992 | Kanemoto et al. | 359/73 |
| 5,659,477 A * | 8/1997 | Collins | 36/468.01 |
| 5,783,289 A | 7/1998 | Suzuki et al. | 428/195 |
| 6,093,578 A * | 7/2000 | Klappert et al. | 348/30 |
| 6,204,906 B1 * | 3/2001 | Tannas | 349/153 |

FOREIGN PATENT DOCUMENTS
| | | | | |
|---|---|---|---|---|
| WO | WO 99/19765 | * | 4/1999 | G02F/1/1333 |

* cited by examiner

*Primary Examiner*—Toan Ton
*Assistant Examiner*—Hoan Nguyen

(57) ABSTRACT

A method of resizing a liquid crystal display (LCD) includes the steps of first determining a desired size for the LCD, thereby identifying an undesired portion of the LCD. Any tape automated bonding strips (TABs) corresponding to the undesired portions of the LCD are then removed. Any flex circuits, or portion thereof, corresponding to the undesired portion of the LCD are cut and removed. Any circuit boards, or portions thereof, corresponding to the undesired portion of the LCD are cut and removed. The display panel is cut to remove a portion of the display panel corresponding to the undesired portion of the LCD. Finally, the cut edge of the display panel is sealed.

12 Claims, 5 Drawing Sheets

METHOD OF RESIZING A LIQUID CRYSTAL DISPLAY

RELATED APPLICATION

The present application claims the priority of U.S. Provisional Application No. 60/172,753, entitled Method of Resizing a Liquid Crystal Display, filed on Dec. 20, 1999, the entirety of which is hereby incorporated by reference.

BACKGROUND OF THE INVENTION

1. Field of the Invention

This invention relates generally to a liquid crystal display (LCD), and more particularly to a method of resizing an LCD.

2. Description of the Related Art

Liquid crystal displays (LCD) are well known throughout the art. An active matrix LCD includes row and column address lines and corresponding driving circuitry. This type of display is commonly known as an "X-Y active matrix type LCD." The row and column address lines are typically driven from two to four sides of the LCD. That is, the row address lines are driven from one or two sides of the display and the column address lines are driven from one or two of the remaining sides of the display. In the case that two drivers are used for the row or column address lines, the lines are driven from opposing sides and are interdigitated.

The row and column address line driver chips are typically mounted on separate printed circuit boards disposed adjacent to the sides of the display panel and function to interface the driver chips with a central controller for controlling the output of the LCD. A flexible circuit assembly is often used for the driver chips.

FIG. 1 is a perspective view of one typical configuration of a conventional LCD. The LCD illustrated in FIG. 1 includes a display panel 10 and a plurality of flex circuits 11 and 14 that support row drivers 12 and column drivers 13, respectively. The row and column drivers 12 and 13 supported on the flex circuits 11 and 14 are connected to the individual address lines (row or column) and extend to the edge of the display panel 10. The flex circuits are typically orthogonal to the plane of the display panel 10 to minimize the additional border area required around the display. Circuit boards 15 and 16 and connectors 17 and 18 interface the driver chips to the central controller.

Another typical configuration for a conventional LCD includes individual driver TABs (tape automated bonding) along each of the sides of the LCD and providing a separate rigid circuit board adjacent each side of the display. Each circuit board interfaces the circuit board with the driver TABs mounted along the corresponding side of the display panel 10. One such driver TAB is illustrated in FIG. 2. The TAB 20 is mounted along an edge of the display panel 10 with the address lines electrically connected to the output leads 29 of driver TAB 20. Window 25 is provided so that output lead support 32 may be mounted to the display panel 10 and base portion 21 can be bent orthogonally to the display panel 10. The base portion 21 includes a plurality of copper input and output traces 31 and 29, respectively. The driver chip 27 is electrically connected to input and output traces 31 and 29, respectively. Input traces 31 receive input signals from the central controller via input connector 34.

The conventional LCDs described above are typically available in various standard sizes. However, an intermediary manufacturer may find it necessary to reduce the size of, or resize, an LCD to conform to the precise specification requirements of the intended use of the LCD. For example, as illustrated in FIG. 3, the intermediary manufacturer may be required to reduce the size and/or change the aspect ratio of an LCD by physically cutting away the undesired portions 38 of the LCD, while maintaining the integrity of the desired portion 37. In doing so, the LCD may optionally be converted from landscape mode to portrait mode, or vice versa.

However, resizing an LCD presents many obstacles due to its construction. The display panel 10 is a laminated glass structure, which includes a pair of opposing transparent glass plates sealed peripherally so as to define a planar cavity in which a liquid crystal layer is retained. When cutting the display panel 10 by scribing the glass plates, the lower plate (active plate) may be damaged by compressive stress when the upper plate (passive plate) is separated at the scribe. In addition, large gas bubbles may appear near the cut edge of the display panel 10 prior to sealing the cut edge, making the LCD unusable.

Further, a method of cutting the associated TABs, flex circuits and/or circuit boards described above is required. That is, a method is needed to remove undesired portions, while maintaining the integrity of the desired portions of the associated TABs, flex circuits and/or circuit boards such that their final size corresponds to the desired size of the display panel.

SUMMARY OF THE INVENTION

It is therefore an object of the present invention to provide a method of resizing an LCD while maintaining the integrity of all remaining desired portions of the LCD.

It is another object of the present invention to provide a method of resizing a display panel of the LCD without damaging the active plate of the display panel.

It is still another object of the present invention to provide a method for repairing the cut edge by replacing accumulated gas bubbles with liquid crystal material.

It is still another object of the present invention to provide a method for sealing the cut edge of the display panel, which allows gas bubbles to escape from the seal region into the sealing adhesive.

It is yet another object of the present invention to provide a method for removing undesired portions of any associated TABs, flex circuits and/or circuit boards, while maintaining the integrity of the desired portions corresponding to the desired size of the display panel.

To achieve the above objects, provided in accordance with the present invention is a method of resizing a liquid crystal display (LCD). The method includes the steps of first determining a desired size for the LCD, thereby identifying an undesired portion of the LCD. Any tape automated bonding strips (TABs) corresponding to the undesired portions of the LCD are then removed. Any flex circuits, or portion thereof, corresponding to the undesired portion of the LCD are cut and removed. Any circuit boards, or portions thereof, corresponding to the undesired portion of the LCD are cut and removed. The display panel is cut to remove a portion of the display panel corresponding to the undesired portion of the LCD. Finally, the cut edge of the display panel is sealed.

BRIEF DESCRIPTION OF THE DRAWINGS

The above objects, features, and advantages of the present invention will become more apparent in light of the following detailed description of exemplary embodiments thereof taken in conjunction with the attached drawings in which.

DESCRIPTION OF THE INVENTION

Figure 1:
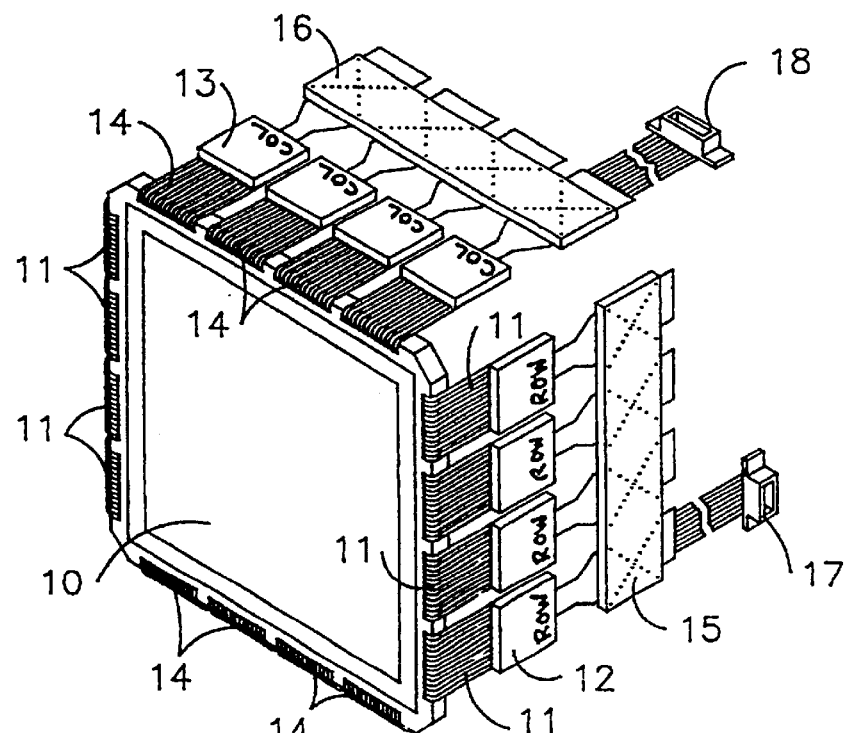
FIG. 1 is a perspective view of a conventional LCD utilizing flex circuits and circuit boards.
Figure 2:
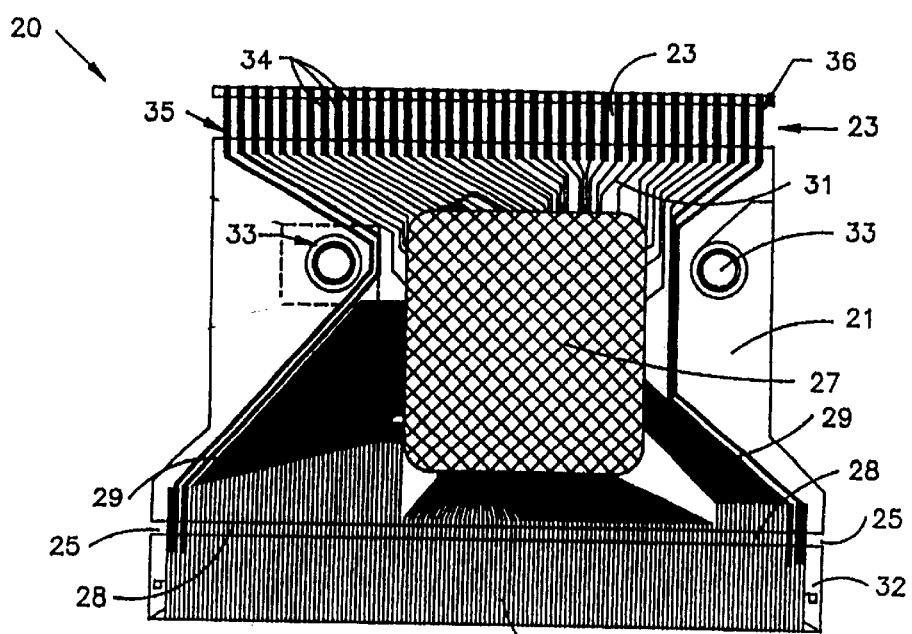
FIG. 2 illustrates a conventional TAB which may optionally be utilized in a conventional LCD.
Figure 3:
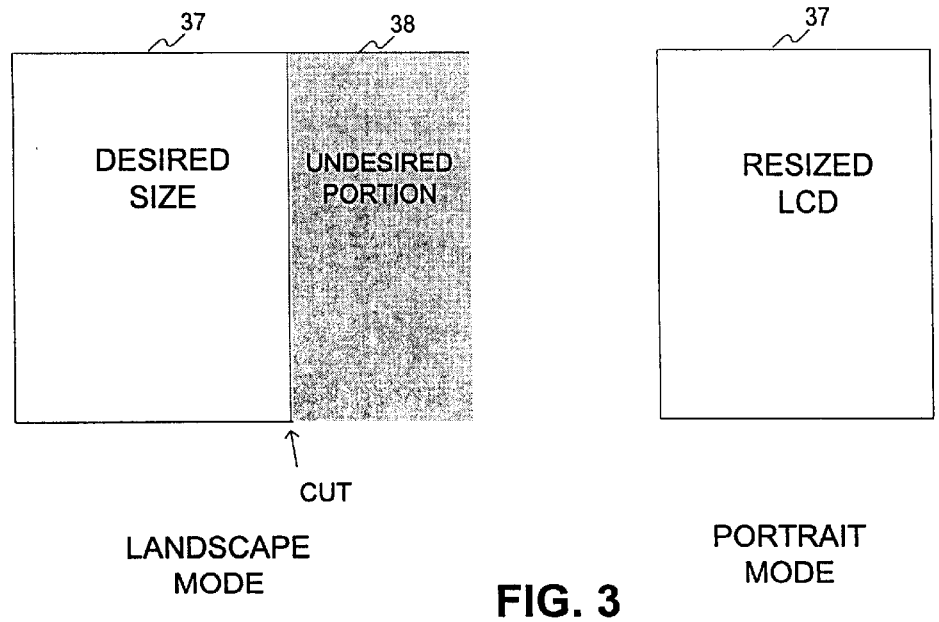
FIG. 3 illustrates an overall view of resizing an LCD in accordance with the present invention.

Turning again to the drawings, in which like reference numerals identify similar or identical elements throughout the several views, the present invention provides a method of reducing, or resizing, an oversized LCD to conform to size constraints. Referring again to FIG. 3, an overall size of the LCD is reduced to a desired size 37 by removing an undesired portion 38. In some cases, the aspect (width vs. height) of the LCD may change from landscape (aspect>1) to portrait (aspect<1) or may become square (aspect=1).

Figure 4:
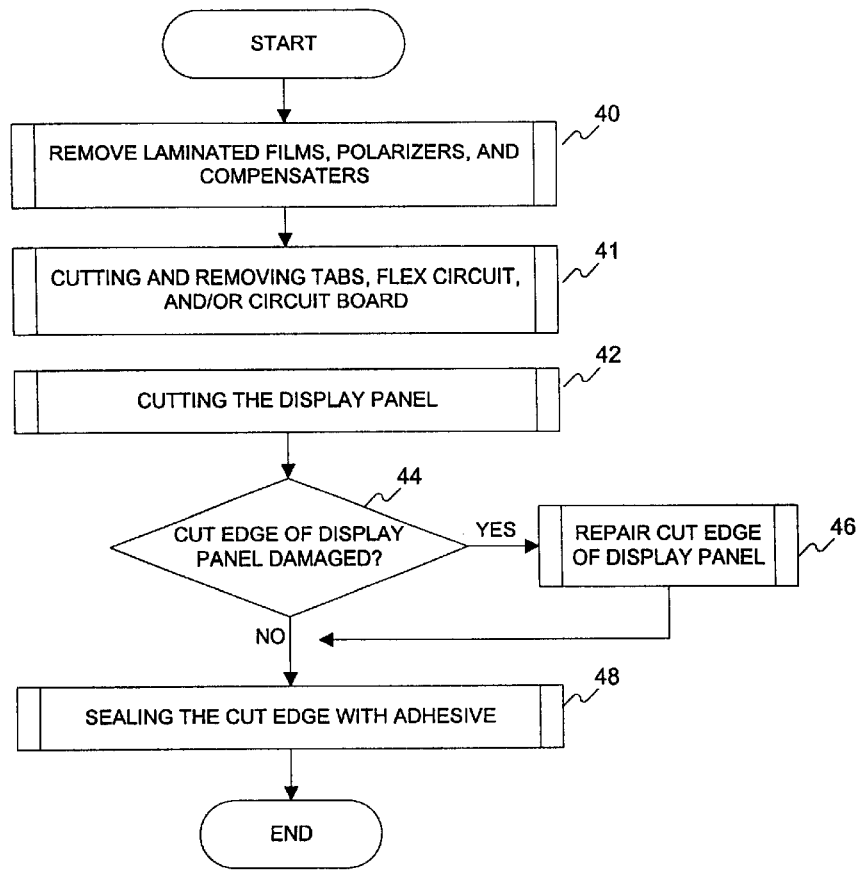
FIG. 4 is a flow chart illustrating a general procedure for resizing an LCD in accordance with the present invention.

FIG. 4 outlines an overall procedure for resizing an LCD. In Step 40, the polarizer (and compensator) films are removed from the top and bottom substrates in the area to be cut. In step 41, the TABs, flex circuit and/or circuit board are cut and the undesired portions are removed. The display panel is then cut in step 42, and the cut side is examined for damage and resulting gas bubbles. If gas bubbles are detected, the edge is repaired in step 46. The cut edge is then sealed with an adhesive in step 48. Each step in the procedure of FIG. 4 is further detailed hereinbelow.

Figure 4A:
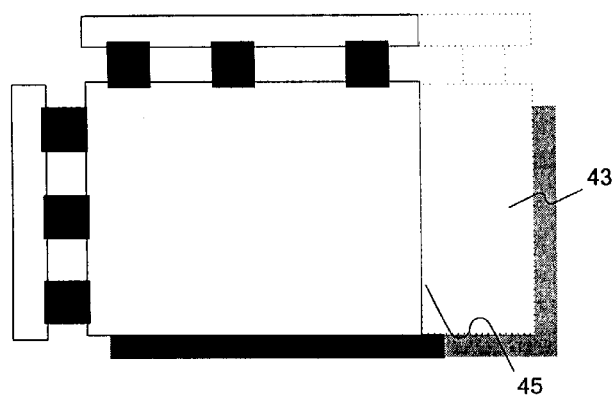
FIGS. 4A, 5 and 6 illustrate the procedure of FIG. 4 on an LCD in accordance with the present invention.

FIG. 4A further details step 40. The films are removed from the front and back surfaces in the undesired portion 43 so that the cutting tool can directly contact the glass substrates along the cutting path 45. This ensures a repeatable, high quality scribe mark. In some cases, all of the film may be removed from both substrates. This may be done, for example, to replace the existing films with new films, which will further enhance the optical and/or environmental performance of the resized LCD.

Figure 5:
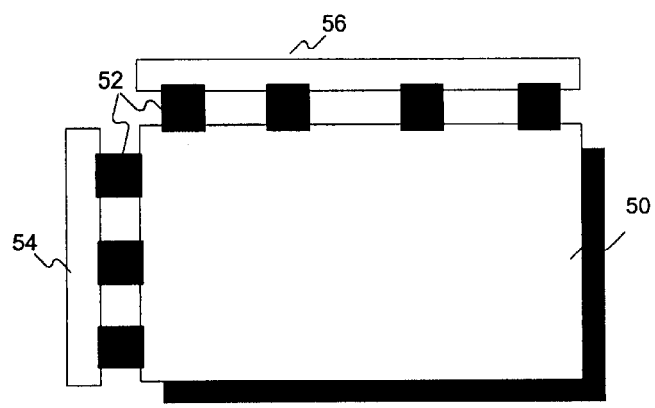
Figure 6:
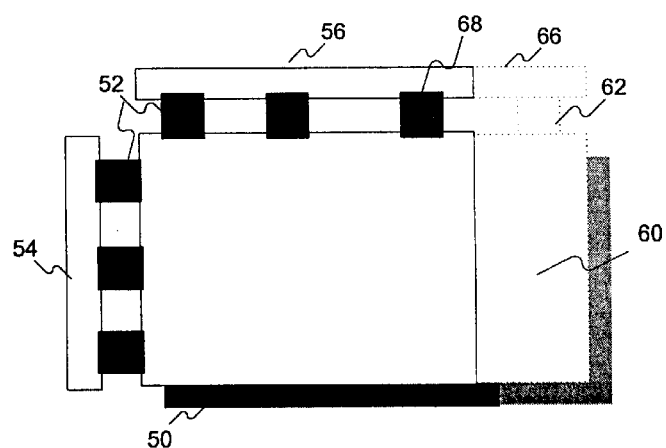

FIGS. 5–6 further detail step 40. FIG. 5 illustrates a top view of an LCD to be resized, which includes a display panel 50, a plurality of TABs 52, a row driver board 54 and a column driver board 56.

In FIG. 6, the undesired portion of the LCD is represented. Here, the undesired portion 60 of the display panel 50, the corresponding TAB 62 and the undesired portion 66 of the column driver board 56, which corresponds to TAB 62, are illustrated. TAB 62 is removed from the display panel 50 using any suitable means, for example, using a heat bar, a hot knife, a cold knife or simply by peeling TAB 62 away by hand. Using a hot knife is currently the best-known method for removing TAB 62. Here, the TAB 62 removed directly corresponds to the column address lines present in the undesired portion 60 of the display panel 50.

The column driver circuit board 56 is correspondingly reduced in size using any suitable means, such as performing an end mill, as is typically utilized in the printed circuit board industry. Special care must be taken to avoid damaging needed traces that serve the last active TAB 68. Therefore, the circuit board must first be examined and the location of the traces serving the last active TAB 68 must be noted. The column driver board 56 is then carefully cut, removing undesired portion 66, while making sure to maintain the integrity of the noted traces serving the last active TAB 68. Once a proper cutting pattern has been identified, all similarly manufactured column boards may be cut using the same pattern. Additionally, mechanical fixtures may be used to aid in the aforementioned processes, to increase both precision and yield, as well as the processes described hereinafter.

A functional test of the LCD may preferably be conducted to ensure that the remaining desired portions of the LCD are completely functional in order to avoid unnecessary expenditures on a permanently damaged assembly.

The procedure outlined above may be used for removing multiple TABs 62. Additionally, while a method of removing a columnar portion of the LCD has been described, a row or horizontal portion may similarly be removed along with the corresponding TABs 62 and corresponding portion of the row driver circuit board 54. Likewise, both a columnar and horizontal portion of the LCD may be removed.

However, where an LCD contains interdigitated row address lines, which are supplied from both opposing sides (right and left), a columnar portion may not be removed without reducing the density of the display. Likewise, where an LCD contains interdigitated column address lines, which are supplied from both opposing sides (top and bottom), a horizontal portion may not be removed without reducing the density of the display.

Figure 7:
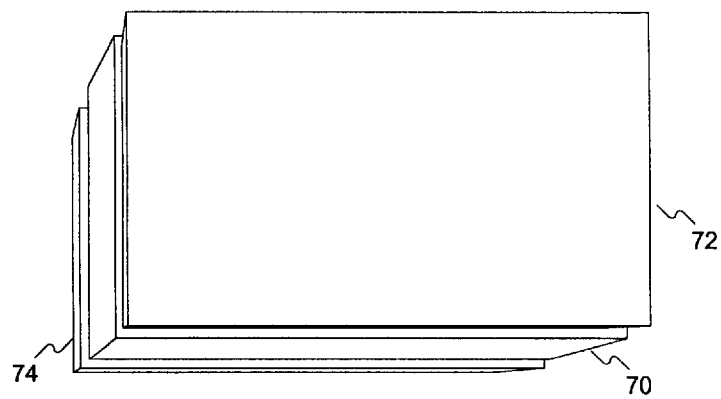
FIGS. 7 and 8 illustrate a method for resizing a display panel in accordance with the present invention.

Another step in the resizing of the LCD involves resizing the display panel 50. A procedure for reducing the size of the display panel, as represented by step 42 of FIG. 4, begins with identifying the undesired portion 50 of the display as shown in FIG. 6. Once the undesired portion has been identified and the TABs are removed as described above, the polarizers 72 and 74 are removed from the display panel as shown in FIG. 7. The display panel 50 will typically be a plate assembly 70, a front polarizer 72 and rear polarizer 74. The front and rear polarizers 72 and 74 may be removed from the entire display panel, or only the section to be removed. In some cases, the polarizers 72 and 74 may be laminated to other films, such as compensation films. For the purposes of brevity, polarizers 72 and 74 are assemblies, which may include various laminates.

In all cases, proper electrostatic discharge (ESD) procedures must be followed to avoid damaging the voltage sensitive devices within the display panel or within the row and column assemblies. This is especially true when removing the adhesive-backed films from the glass substrates. As is well known in the art, removing tape from a surface leads to an effect called tribocharging. When two materials are brought into close contact and separated, a transfer of electrons occurs between them. The materials acquire opposite charges, and in the case of non-conductors, the charge imbalance stays localized on the surface at the point of separation. Since both the film and glass substrate are non-conductors, ESD must be controlled by using ionizers, regulating the speed of the separation process and controlling the relative humidity.

Figure 8:
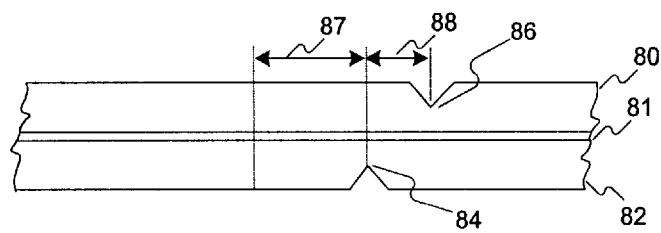

Referring to FIG. 8, the plate assembly 70 comprises active plate 82 and passive plate 80, which enclose the liquid crystal material 81. The passive plate 80 and the active plate 82 are each scribed, creating scribes 84 and 86, the closest of which is offset from an active area of the display panel by a first offset distance 87, preferably 3 mm or greater. The active area is the portion of the resized LCD that is functional for display purposes. The first offset functions to minimize migration of the edge seal adhesive into the active area, thereby causing degradation in optical performance. In the preferred embodiment, scribes 84 and 86 are offset by a second offset distance 88, which is preferably 1–2mm. The purpose for the second offset 88 is to provide ample area for the sealing operation. Either the active plate 82 or the passive plate 80 may contain the additional surface area, to allow ample area for the adhesive. In any case, it is preferable to have an overall offset (first offset 87 plus second offset 88) of at least 5 mm. In the preferred embodiment shown in FIG. 8, the passive plate 80 overhangs the active plate 82 in order to protect the active plate from being exposed to potential sources of damage prior to edge sealing. The offset 88 further serves to prevent short circuits in the desired portion of the active plate 82 resulting from compressive stress induced on the active plate 82 when the passive plate 80 is broken at scribe 86.

Next, the plate assembly 70 is broken at each scribe 84, 86. In a preferred embodiment, the passive plate 80 is broken first to further protect the integrity of the active plate 82. An angular displacement of approximately 1° is required to break the plate assembly 70 along each scribe 84, 86.

Figure 11:
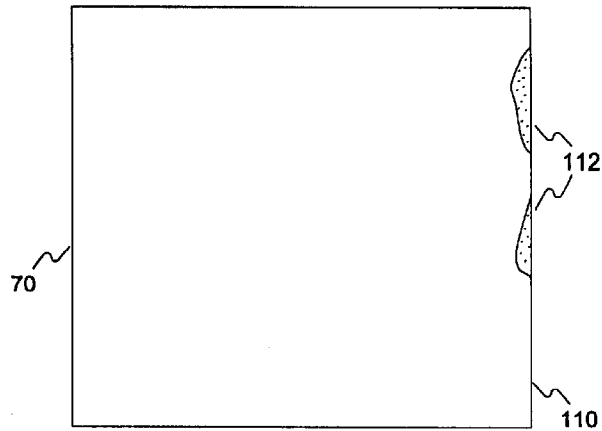
Figure 12:
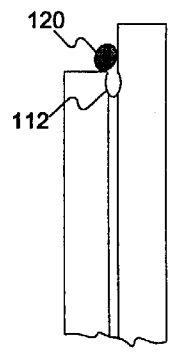

Referring to FIG. 11, the panel assembly 70 may then be inspected along cut side 110 for damage or gas bubbles 112 resulting from the break. The gas bubbles may then be eliminated by positioning the cut edge 110 oblique or vertical, as illustrated in FIG. 12. Some liquid crystal material 120 is applied to edge 110 while the vertical orientation of the panel assembly 70 is maintained. Here, the liquid crystal may be doped or undoped material. Preferably, the liquid crystal is doped to match the liquid crystal of the raw panel. The panel assembly 70, still oblique or vertical, is placed in a vacuum to allow the gas bubbles to escape from the cut edge 110. Once the gas bubbles12 have escaped, the liquid crystal 120 added will fill the void created, thereby replacing the gas bubbles 112 with liquid crystal 120. This process may be facilitated by optionally preheating the plate assembly 70 prior to placing it in the vacuum.

Figure 9:
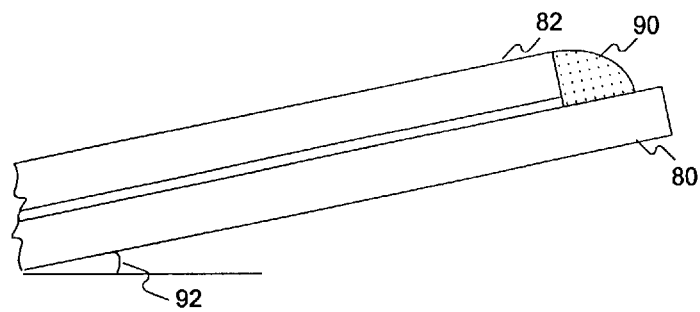
FIGS. 9–12 illustrate a method of sealing a panel assembly in accordance with the present invention.

Referring to FIG. 9, a method of sealing the panel assembly 70 is illustrated, as represented by step 48 of FIG. 4. The panel assembly is sealed by applying an adhesive 90 to the cut edge 110. Many suitable adhesives may be used, including UV (ultraviolet), air, and heat cured adhesives. In a preferred embodiment, a UV cured adhesive is used. The panel assembly 70 is tilted to a small angle 92 to raise the sealed region. The tilt allows any remaining gas bubbles 112 to escape into the adhesive 90, where they may safely reside without seriously compromising the effectiveness of the seal. The edge 110 does not have to be cleaned prior to applying adhesive 90, since any residual liquid crystal material 81 will dissolve into the adhesive 90. After the adhesive 90 has been properly applied, it is cured using methods appropriate for the adhesive type, and commonly known in the art.

Figure 10:
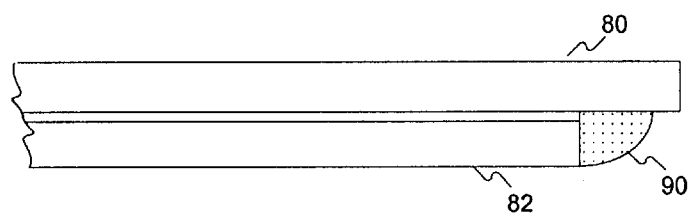

FIG. 10 illustrates the preferred embodiment of a sealed panel assembly 70.

Figure 13:
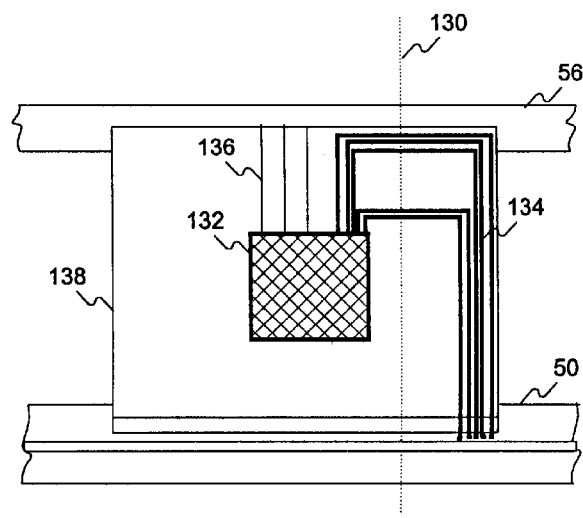
FIG. 13 illustrates a method of cutting a flex circuit in accordance with the present invention.

Referring now to FIG. 13, a flex circuit 138 is illustrated, as represented by step 40 of FIG. 4. The flex circuit 138 is interposed between the display panel 50 and a circuit board 56. The flex circuit 138 includes driver chip 132, input traces 136, and output traces 134. The input traces 136 transfer electrical signals from the circuit board 56 to the driver chip 132, and may not be cut or damaged. The output traces 134 correspond to the address lines served by the driver chip 132 for the corresponding portion of the display panel 50. Some of the output traces 134 may drive address lines in the undesired portion 60 of the display panel 50. In such a case, the output traces 134 and the corresponding portion of the flex circuit 138 may be cut and discarded.

The flex circuit is carefully examined to determine which of the output traces 134 are no longer needed. The number of output traces 134 typically outnumbers the number of input traces 136. Therefore, all the input traces 136 are typically gathered on the side of the driver chip facing the circuit board 56, while the output traces 134 are typically found on all sides of the driver chip 132. Next, an optical axis 130 of the cut line must be determined such that only output traces 134 no longer required are cut, without damaging the remaining output traces 134 or any of the input traces 136. The cut then is made using a sharp edge. An X-acto knife is preferably used to make the cut. Once again, proper ESD procedures are preferably employed.

In a case where the polarizers are removed prior to resizing, new films are laminated to the display at this time. The lamination and orientation of the polarizers are well known in the art.

Accordingly, using the procedure outlined in FIG. 4 and further detailed above, a novel method of resizing an LCD is disclosed.

While the present invention has been described in detail with reference to the preferred embodiments, they represent mere exemplary applications. Thus, it is to be clearly understood that many variations may be made by anyone having ordinary skill in the art while staying within the spirit and scope of the present invention as defined by the appended claims.

What is claimed is:

1. A method of resizing a liquid crystal display (LCD), comprising the steps of:
   determining a desired new active area size for the LCD, thereby identifying an undesired portion of the LCD; and
   cutting and removing any tape automated bonding strips (TABs), flex circuits), circuit boards or portions thereof, corresponding to the undesired portion of the LCD;
   removing all attached polarizing and/or compensating films from the LCD;
   cutting a display panel to remove a portion of the display panel corresponding to the undesired portion of the LCD, said cutting step comprising
      determining a first offset distance from the new active area,
      scribing an active plate of said LCD at the first offset distance,
      determining a second offset distance from said first offset distance,
      scribing a passive plate of said LCD at the second offset distance,
      applying an angular displacement to first break the passive plate of said LCD, and
      continuing to apply said angular displacement to next break the active plate of said LCD;
   inspecting a cut edge of said display panel:
      repairing, if necessary, the cut edge of the display panel;
      sealing the cut edge with adhesive; and
      laminating new compensator and/or polarizer films to said LCD.

2. The method recited in claim 1, wherein the step of repairing the cut edge of the display panel further comprises the steps of:
   placing a panel assembly in a vertical orientation with said cut edge on top;
   placing the panel assembly in a vacuum;
   allowing gas bubbles to escape from the cut edge;
   applying additional liquid crystal material to the cut edge; and
   removing the panel assembly from the vacuum.

3. The method recited in claim 1, wherein the step of sealing the cut edge with adhesive further comprises the steps of:
   applying adhesive to the cut edge, thereby creating a sealed region;
   raising the sealed region by tilting the display panel to a predetermined angle;
   allowing any remaining gas bubbles to escape into the adhesive; and
   curing the adhesive.

4. The method recited in claim 1, wherein:
   both a columnar and a horizontal portion of the LCD are removed.

5. A method of resizing a liquid crystal display (LCD), comprising the steps of:
   determining a desired size for the LCD, thereby identifying an undesired portion of the LCD;
   removing any tape automated bonding strips (TABs) corresponding to the undesired portions of the LCD;
   removing any flex circuits, or portions thereof, corresponding to the undesired portion of the LCD;
   removing any circuit boards or portions thereof, corresponding to the undesired portion of the LCD; and
   cutting a display panel to remove a portion of the display panel corresponding to the undesired portion of the LCD, wherein cutting the display comprises the further steps of;
   removing any attached polarizers from the display panel in an area to be cut;
   scribing an active plate and a passive plate of the display panel; and
   breaking the active plate and the passive plate by applying an angular displacement of approximately 1° to each of the active plate and the passive plate, leaving a cut edge.

6. The method recited in claim 5, wherein the closer of the active plate scribe and the passive plate scribe to an active area of the display panel is at a first offset distance from the active area of the display panel, and the active plate scribe is offset by a second offset distance from the passive plate scribe.

7. The method recited in claim 6, wherein said second offset distance increases the size of the passive plate over the active plate.

8. The method recited in claim 6, wherein said second offset distance increases the size of the active plate over the passive plate.

9. The method recited in claim 6, comprising the additional step of sealing the cut edge by applying a sealing adhesive thereto.

10. The method recited in claim 9, wherein the sealing adhesive is selected from the group consisting of ultraviolet cured sealing adhesive, heat cured sealing adhesive and air cured sealing adhesive.

11. The method recited in claim 9, wherein the cut edge is placed at an angle during application and curing of the sealing adhesive to allow gas to escape into the sealing adhesive.

12. The method recited in claim 5, wherein the passive plate is broken first to minimize damage to the active plate.

* * * * *